United States Patent
Homma et al.

(10) Patent No.: US 9,167,828 B2
(45) Date of Patent: *Oct. 27, 2015

(54) OIL/FAT COMPOSITION

(75) Inventors: Rika Homma, Utsunomiya (JP); Yoshihide Asabu, Sumida-ku (JP)

(73) Assignee: KAO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/240,209

(22) PCT Filed: Aug. 21, 2012

(86) PCT No.: PCT/JP2012/071087
§ 371 (c)(1),
(2), (4) Date: Feb. 21, 2014

(87) PCT Pub. No.: WO2013/027729
PCT Pub. Date: Feb. 28, 2013

(65) Prior Publication Data
US 2014/0170296 A1    Jun. 19, 2014

(30) Foreign Application Priority Data
Aug. 22, 2011 (JP) ................................ 2011-180792

(51) Int. Cl.
| A23D 7/00 | (2006.01) |
| A23G 9/04 | (2006.01) |
| A23D 7/01 | (2006.01) |
| A23D 9/013 | (2006.01) |
| A23G 9/32 | (2006.01) |

(52) U.S. Cl.
CPC *A23D 7/003* (2013.01); *A23D 7/01* (2013.01); *A23D 7/011* (2013.01); *A23D 9/013* (2013.01); *A23G 9/04* (2013.01); *A23G 9/327* (2013.01)

(58) Field of Classification Search
IPC .... A23D 7/003,7/011, 9/013, 7/01; A23G 9/04, A23G 9/327
See application file for complete search history.

(56) References Cited

U.S. PATENT DOCUMENTS

| 5,879,735 A * | 3/1999 | Cain et al. ............... 426/603 |
| 5,891,495 A | 4/1999 | Cain et al. |
| 5,912,042 A | 6/1999 | Cain et al. |
| 6,004,611 A | 12/1999 | Gotoh et al. |
| 6,022,579 A | 2/2000 | Mori et al. |
| 2012/0259133 A1 | 10/2012 | Homma et al. |
| 2013/0023684 A1 | 1/2013 | Moriwaki et al. |
| 2013/0230630 A1 | 9/2013 | Homma et al. |
| 2013/0280407 A1 | 10/2013 | Homma et al. |

FOREIGN PATENT DOCUMENTS

| CN | 1056730 C | 9/2000 |
| EP | 0 744 899 | 12/1996 |
| EP | 0 744 900 | 12/1996 |
| JP | 4 300826 | 10/1992 |
| JP | 7 38780 | 5/1995 |
| JP | 9 510622 | 10/1997 |
| JP | 10 176181 | 6/1998 |
| JP | 11 169074 | 6/1999 |
| JP | 11 243855 | 9/1999 |
| JP | 2010 268749 | 12/2010 |
| WO | WO 95/29596 | 11/1995 |
| WO | 2010 019598 | 2/2010 |

OTHER PUBLICATIONS

Swern, D. 1979. Bailey's Industrial Oil and Fat Products, vol. 1, 4$^{th}$ edition. John Wiley & Sons, New York. p. 315.*
International Search Report Issued Sep. 25, 2012 in PCT/JP12/071087 Filed Aug. 21, 2012.
U.S. Appl. No. 14/350,955, filed Apr. 10, 2014, Homma.
U.S. Appl. No. 14/240,214, filed Feb. 21, 2014, Homma et al.
U.S. Appl. No. 14/347,888, filed Mar. 27, 2014, Homma et al.
U.S. Appl. No. 14/347,915, filed Mar. 27, 2014, Homma et al.
U.S. Appl. No. 14/240,295, filed Feb. 21, 2014, Homma et al.
U.S. Appl. No. 14/240,206, filed Feb. 21, 2014, Homma et al.
U.S. Appl. No. 14/240,248, filed Feb. 21, 2014, Homma et al.
International Preliminary Report on Patentability and Written Opinion issued on Mar. 6, 2014, in PCT/JP2012/071087 filed Aug. 21, 2012 submitting English translation only.
Youyi Chen, et al., "Modern Making Technology for Snack", China Machine Press, Edit 2, Feb. 2012, p. 62 (with Partial English Translation).

* cited by examiner

*Primary Examiner* — Chhaya Sayala
(74) *Attorney, Agent, or Firm* — Oblon, McClelland, Maier & Neustadt, L.L.P.

(57) ABSTRACT

Provided is a fat or oil composition, comprising 50 mass % or more of diacylglycerols satisfying the following (1) to (4): (1) 20 to 92 mass % of a disaturated diacylglycerol (SS) in the diacylglycerols; (2) 60 mass % or less of a monosaturated-monounsaturated diacylglycerol (SU) in the diacylglycerols; (3) 8 to 80 mass % of a diunsaturated diacylglycerol (UU) in the diacylglycerols; and (4) 20 mass % or more of a total content of saturated fatty acids having 10, 12, and 14 carbon atoms in saturated fatty acids constituting the diacylglycerols.

22 Claims, No Drawings

OIL/FAT COMPOSITION

FIELD OF THE INVENTION

The present invention relates to a fat or oil composition, which is suited for a frozen dessert such as an ice cream.

BACKGROUND OF THE INVENTION

A fat or oil has been conventionally blended in a frozen dessert for the purpose of, for example, imparting a taste and flavor, improving a palate feeling, or improving physical properties.

As the fat or oil for a frozen dessert, the following (1) to (4) has been heavily used: (1) a liquid oil typified by soybean oil or rapeseed oil having an extremely low melting point in consideration of a satisfactory melt-in-the-mouth feeling in a freezing temperature range; (2) an SUS-type triglyceride characterized by having a sharp melt-in-the-mouth feeling at temperatures near the body temperature (a triglyceride having an unsaturated fatty acid at the 2-position and saturated fatty acids at the 1- and 3-positions; (3) a lauric acid-rich fat or oil such as coconut oil or palm kernel oil; and (4) a solid fat typified by palm oil.

However, the liquid oil (1) is insufficient in amount of crystals even at low temperature and hence is poor in emulsion stability. In the case of the solid fats (2) to (4), all of the fats or oils containing the solid fats pass through the throat to be ingested without melting in the mouth. Hence, the solid fats are poor in melt-in-the-mouth feeling in some cases. In addition, the solid fats are liable to provide frozen desserts with poor fineness and texture.

On the other hand, a fat or oil containing diacylglycerols at high concentrations has been known to have physiological effects such as suppression of an increase in triglyceride (neutral fat) in blood after meal and less accumulation in the body (Patent Documents 1 and 2), and is expected to be used as an alternative to conventional fats or oils.

Hitherto, for example, a diacylglycerol-containing semi-solid fat or oil or the like synthesized from palm oil or the like has been reported as the diacylglycerol-containing fat or oil (Patent Document 3).

CITATION LIST

Patent Document

[Patent Document 1] JP-A-4-300826
[Patent Document 2] JP-A-10-176181
[Patent Document 3] WO-A-2010/019598

SUMMARY OF THE INVENTION

The present invention provides a fat or oil composition, comprising 50 mass % or more of diacylglycerols satisfying the following (1) to (4):

(1) 20 to 92 mass % of a disaturated diacylglycerol (SS) in the diacylglycerols;
(2) 60 mass % or less of a monosaturated-monounsaturated diacylglycerol (SU) in the diacylglycerols;
(3) 8 to 80 mass % of a diunsaturated diacylglycerol (UU) in the diacylglycerols; and
(4) 20 mass % or more of a total content of saturated fatty acids having 10, 12, and 14 carbon atoms in saturated fatty acids constituting the diacylglycerols.

The present invention also provides an emulsion, comprising the fat or oil composition, and having a mass ratio between an oil phase and an aqueous phase of from 10:90 to 90:10.

DETAILED DESCRIPTION OF THE INVENTION

However, it found that, when the diacylglycerol-containing fat or oil produced by a conventional technology is used for frozen desserts, the fat or oil has properties of being poor in emulsion stability and being liable to be demulsified during freezing.

Therefore, the present invention relates to providing a fat or oil composition that is excellent in emulsion stability and crystallization property, has a satisfactory melt-in-the-mouth feeling and the like, and has a high content of diacylglycerol.

The inventors of the present invention made intensive studies to search a fat or oil capable of imparting excellent properties to frozen desserts with focusing attention on the ratio of a diacylglycerol having a specific structure in diacylglycerols, and as a result, found that it is possible to produce a fat or oil composition that is excellent in emulsion stability and crystallization property in the range of refrigeration and freezing temperatures, has a satisfactory melt-in-the-mouth feeling at a temperature near the body temperature or the like, and has performance suited for a fat or oil for frozen desserts, when the fat or oil composition contains specific amounts of a diacylglycerol including only saturated fatty acids, a diacylglycerol including only unsaturated fatty acids, and a diacylglycerol including a saturated fatty acid and an unsaturated fatty acid, respectively, and the ratio of a specific fatty acid in the diacylglycerols is adjusted within a predetermined range.

According to the present invention, it is possible to produce a fat or oil composition that is excellent in emulsion stability and crystallization property in the range of refrigeration and freezing temperatures, has satisfactory fineness and texture, can be used for producing a frozen dessert excellent in melt-in-the-mouth feeling or the like, and has a high content of diacylglycerol.

The fat or oil composition according to the present invention contains 50 mass % (hereinafter referred to as "%") or more, preferably 55% or more, preferably 60% or more, preferably 65% or more, more preferably 70% or more, even more preferably 75% or more of the diacylglycerols. In addition, the upper limit of the content of the diacylglycerols is preferably 95% or less, more preferably 90% or less, even more preferably 88% or less. Specifically, the fat or oil composition contains more preferably from 55 to 95%, more preferably from 60 to 95%, more preferably from 65 to 95%, more preferably from 70 to 95%, more preferably from 70 to 90%, even more preferably from 75 to 88% of the diacylglycerols. The content of the diacylglycerols that falls within the above-mentioned range is preferred from the viewpoints of physiological effects and a satisfactory taste and flavor. It should be noted that, in the present invention, the "fat or oil" contains any one or more of triacylglycerols, diacylglycerols, and monoacylglycerols.

The diacylglycerols according to the present invention satisfy the following (1) to (4):

(1) 20 to 92% of a disaturated diacylglycerol (SS) in the diacylglycerols;
(2) 60% or less of a monosaturated-monounsaturated diacylglycerol (SU) in the diacylglycerols;
(3) 8 to 80% of a diunsaturated diacylglycerol (UU) in the diacylglycerols; and
(4) 20% or more of a total content of saturated fatty acids having 10, 12, and 14 carbon atoms in saturated fatty acids constituting the diacylglycerols.

In the diacylglycerols, the content of the disaturated diacylglycerol (SS), whose constituent fatty acids include two saturated fatty acids, is from 20 to 92%, preferably 25% or more, more preferably 30% or more, and is preferably 85% or less, more preferably 80% or less, more preferably 75% or less, more preferably 70% or less, even more preferably 62% or less. Specifically, the content is preferably from 25 to 85%, more preferably from 25 to 80%, more preferably from 30 to 75%, more preferably from 30 to 70%, even more preferably from 30 to 62%. The content of SS that falls within the above-mentioned range is preferred from the viewpoints of satisfactory fineness and texture (roughness). The saturated fatty acids each have preferably from 8 to 22 carbon atoms, more preferably from 10 to 14 carbon atoms.

In the diacylglycerols, the content of the monosaturated-monounsaturated diacylglycerol (SU), whose constituent fatty acids include a saturated fatty acid and an unsaturated fatty acid, is 60% or less, preferably 50% or less, more preferably 45% or less, more preferably 40% or less, more preferably 35% or less, even more preferably 33% or less. The lower limit of the content of SU is preferably 0, more preferably 2% or more, more preferably 4% or more, even more preferably 6% or more. Specifically, the content is preferably from 0 to 50%, more preferably from 0 to 45%, more preferably from 0 to 40%, more preferably from 2 to 35%, more preferably from 4 to 33%, even more preferably from 6 to 33%. The content of SU that falls within the above-mentioned range is preferred from the viewpoint of a satisfactory palate feeling. The unsaturated fatty acid has preferably from 14 to 24 carbon atoms, more preferably from 16 to 22 carbon atoms, from the viewpoint of physiological effects.

Further, in the diacylglycerols, the content of the diunsaturated diacylglycerol (UU), whose constituent fatty acids include two unsaturated fatty acids, is from 8 to 80%, preferably 10% or more, more preferably 13% or more, more preferably 15% or more, even more preferably 18% or more, and is preferably 75% or less, more preferably 70% or less, more preferably 60% or less, even more preferably 50% or less. Specifically, the content is preferably from 10 to 80%, more preferably from 13 to 80%, more preferably from 18 to 80%, more preferably from 18 to 75%, more preferably from 18 to 70%, more preferably from 18 to 60%, even more preferably from 18 to 50%. The content of UU that falls within the above-mentioned range is preferred from the viewpoint of satisfactory emulsion stability. Preferred examples of the unsaturated fatty acids are as described above.

The positions of the saturated fatty acid(s) and/or the unsaturated fatty acid(s) constituting each of the diacylglycerols may be the 1-position and 3-position of glycerol, or may be the 1-position and 2-position of glycerol.

The total content of the saturated fatty acids having 10, 12, and 14 carbon atoms in the saturated fatty acids constituting the diacylglycerols is 20% or more, preferably 25% or more, more preferably 30% or more, more preferably 50% or more, more preferably 60% or more, even more preferably 65% or more. In addition, the upper limit of the total content of the saturated fatty acids is preferably 80% or less. Specifically, the total content is preferably from 20 to 80%, more preferably from 25 to 80%, more preferably from 30 to 80%, more preferably from 50 to 80%, more preferably from 60 to 80%, even more preferably from 65 to 80%. The total content of the saturated fatty acids that falls within the above-mentioned range is preferred from the viewpoint of a satisfactory melt-in-the-mouth feeling. It should be noted that the saturated fatty acids in the fatty acids constituting the diacylglycerols each have preferably from 8 to 22 carbon atoms, more preferably from 10 to 14 carbon atoms, from the viewpoint of a satisfactory melt-in-the-mouth feeling.

The fat or oil composition in the present invention preferably contains triacylglycerols, and the content of the triacylglycerols is preferably 1% or more, more preferably 5% or more, more preferably 10% or more, even more preferably 12% or more, and is preferably 49% or less, more preferably 45% or less, more preferably 40% or less, more preferably 39.5% or less, more preferably 35% or less, more preferably 30% or less, more preferably 25% or less, even more preferably 20% or less. Specifically, the content is preferably from 1 to 49%, more preferably from 5 to 45%, more preferably from 5 to 40%, more preferably from 5 to 30%, more preferably from 10 to 30%, even more preferably from 12 to 25%, from the viewpoint of industrial productivity.

In addition, in the fat or oil composition, the content of monoacylglycerols is preferably 10% or less, more preferably from 0.01 to 8%, and the content of free fatty acids (salts) is 3.5% or less, more preferably from 0.01 to 1.5%, from the viewpoint of a taste and flavor or the like. The constituent fatty acids of the triacylglycerols and the monoacylglycerols are preferably the same as the constituent fatty acids of the diacylglycerols, from the viewpoints of physiological effects and the industrial productivity of the fat or oil.

The fat or oil composition according to the present invention has a solid fat content at 5° C. of preferably from 15 to 65%, more preferably from 25 to 60%, even more preferably from 30 to 55%, from the viewpoint of a palate feeling. In addition, the fat or oil composition according to the present invention has a solid fat content at 20° C. of preferably from 8 to 40%, more preferably from 11 to 35%, even more preferably from 12 to 30%, from the viewpoint of a satisfactory melt-in-the-mouth feeling.

The fat or oil composition according to the present invention can be produced by, for example, separately preparing a fat or oil containing a high concentration of the disaturated diacylglycerol (SS), which includes only the saturated fatty acids, and a fat or oil containing a high concentration of the diunsaturated diacylglycerol (UU), which includes only the unsaturated fatty acids, or the like and then blending the fats or oils so that the diacylglycerols have the above-mentioned specific composition. Further, if necessary, a usual edible fat or oil may be blended.

The edible fat or oil may be any of a plant-derived fat or oil and an animal-derived fat or oil. A specific raw material therefor may be exemplified by: plant-derived fats or oils such as soybean oil, rapeseed oil, safflower oil, rice oil, corn oil, sunflower oil, cotton seed oil, olive oil, sesame oil, peanut oil, Job's tears seed oil, wheat germ oil, Japanese basil oil, linseed oil, perilla oil, sacha inchi oil, walnut oil, kiwi seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao butter, sal butter, shea butter, and algae oil; and animal-derived fats or oils such as fish oil, lard, beef tallow, and butter fat. In addition, fats or oils such as transesterified oils, hydrogenated oils, and fractionated oils thereof may be used. In the case of using the hydrogenated oil, a fully hardened oil is preferably used because a content of a trans unsaturated fatty acid in the total fatty acids constituting the fat or oil can be decreased. The oils may be used singly or may be mixed appropriately before use. Of those, from the viewpoint of usability, a plant-derived fat or oil is preferably used.

A fat or oil containing a high content of diacylglycerol can be obtained through an esterification reaction of a fatty acid and glycerin, a glycerolysis reaction of a fat or oil and glycerin, or the like. From the viewpoint of controlling the fatty acid composition, it is preferably obtained by an esterification reaction of a raw material fat or oil-derived fatty acid and glycerin.

The esterification reaction and/or the glycerolysis reaction are roughly classified into chemical methods using a chemical catalyst such as an alkali metal or an alloy thereof, an oxide, hydroxide, or alkoxide having from 1 to 3 carbon atoms of an alkali metal or an alkali earth metal, and enzymatic methods using an enzyme such as a lipase. In particular, the reactions are preferably carried out under enzymatically mild conditions by using a lipase or the like as the catalyst, from the viewpoint of an excellent taste and flavor or the like.

After the esterification reaction and/or the glycerolysis reaction, a purification step usually employed for the fat or oil may be carried out. Specific examples thereof include steps of acid treatment, water washing, decoloration, and deodorization or the like.

The raw material fat or oil for the fatty acid used in the esterification reaction and the raw material fat or oil used in the glycerolysis reaction may be the fats or oils listed above as the edible fats or oils.

The fat or oil composition according to the present invention preferably contains an antioxidant. The content of the antioxidant in the fat or oil composition is preferably from 0.005 to 0.5%, more preferably from 0.04 to 0.25%, even more preferably from 0.08 to 0.2%, from the viewpoints of, for example, a taste and flavor, oxidation stability, and suppression of coloration. Any antioxidant that is usually used in a food may be used as the antioxidant. It is possible to use, for example, vitamin E, butylhydroxytoluene (BHT), butylhydroxyanisole (BHA), t-butylhydroquinone (TBHQ), vitamin C or derivatives thereof, phospholipids, and natural antioxidants such as a rosemary extract.

The fat or oil composition according to the present invention can be used for an oil-in-water emulsion or a water-in-oil emulsion. A mass ratio between an aqueous phase and an oil phase is not particularly limited, but is preferably "oil phase:aqueous phase"=from 10:90 to 90:10, more preferably "oil phase:aqueous phase"=from 20:80 to 80:20, even more preferably "oil phase:aqueous phase"=from 30:70 to 70:30.

In the case where the fat or oil composition is formed into an emulsion, a component usually used for an emulsion, such as an emulsifier, an antioxidant, a stabilizer, a thickener, a gelling agent, or a surfactant, may be appropriately blended. Further, another fat or oil may be blended in the oil phase in addition to the fat or oil composition according to the present invention. Examples of another fat or oil may include usual animal- and plant-derived edible fats or oils as mentioned above and processed fats or oils.

The fat or oil composition according to the present invention is in a solid state at normal temperature (20° C.) and can be applied as an edible fat or oil to a variety of foods and beverages. In particular, the fat or oil composition is suited for frozen desserts because the composition has an excellent melt-in-the-mouth feeling in the mouth and is excellent in emulsion stability and crystallization property in the range of refrigeration and freezing temperatures. The frozen desserts are not particularly limited as long as the preservation temperature or ingestion temperature falls within the range of refrigeration and freezing temperatures, and examples thereof include ice creams (ice cream, ice milk, and lactic ice) and edible ices (such as sherbet and shaved ice).

Next, aspects and preferred embodiments of the present invention are described.

<1> A fat or oil composition, comprising 50 mass % or more of diacylglycerols satisfying the following (1) to (4):
(1) 20 to 92 mass % of a disaturated diacylglycerol (SS) in the diacylglycerols;
(2) 60 mass % or less of a monosaturated-monounsaturated diacylglycerol (SU) in the diacylglycerols;
(3) 8 to 80 mass % of a diunsaturated diacylglycerol (UU) in the diacylglycerols; and
(4) 20 mass % or more of a total content of saturated fatty acids having 10, 12, and 14 carbon atoms in saturated fatty acids constituting the diacylglycerols.

<2> The fat or oil composition according to Item <1>, in which the content of the diacylglycerols in the fat or oil composition is 55 mass % or more, preferably 60 mass % or more, more preferably 65 mass % or more, more preferably 70 mass % or more, even more preferably 75 mass % or more, and is 95 mass % or less, preferably 90 mass % or less, more preferably 88 mass % or less.

<3> The fat or oil composition according to Item <1> or <2>, in which the content of the disaturated diacylglycerol (SS), whose constituent fatty acids include two saturated fatty acids, in the diacylglycerols is 25 mass % or more, preferably 30 mass % or more, and is 85 mass % or less, preferably 80 mass % or less, more preferably 75 mass % or less, more preferably 70 mass % or less, even more preferably 62 mass % or less.

<4> The fat or oil composition according to any one of Items <1> to <3>, in which the content of the monosaturated-monounsaturated diacylglycerol (SU), whose constituent fatty acids include a saturated fatty acid and an unsaturated fatty acid, in the diacylglycerols is 50 mass % or less, preferably 45 mass % or less, more preferably 40 mass % or less, more preferably 35 mass % or less, even more preferably 33 mass % or less, and the lower limit of the content, which may be 0, is preferably 2 mass % or more, more preferably 4 mass % or more, even more preferably 6 mass % or more.

<5> The fat or oil composition according to any one of Items <1> to <4>, in which the content of the diunsaturated diacylglycerol (UU), whose constituent fatty acids include two unsaturated fatty acids, in the diacylglycerols is 10 mass % or more, preferably 13 mass % or more, more preferably 15 mass % or more, even more preferably 18 mass % or more, and is 75 mass % or less, preferably 70 mass % or less, more preferably 60 mass % or less, even more preferably 50 mass % or less.

<6> The fat or oil composition according to any one of Items <1> to <5>, in which the total content of saturated fatty acids having 10, 12, and 14 carbon atoms in saturated fatty acids constituting the diacylglycerols is 25 mass % or more, preferably 30 mass % or more, more preferably 50 mass % or more, more preferably 60 mass % or more, even more preferably 65 mass % or more, and the upper limit thereof is 80 mass % or less.

<7> The fat or oil composition according to any one of Items <1> to <6>, in which the saturated fatty acids in the fatty acids constituting the diacylglycerols each have from 8 to 22 carbon atoms, preferably from 10 to 14 carbon atoms.

<8> The fat or oil composition according to any one of Items <1> to <7>, in which the unsaturated fatty acids constituting the diacylglycerols each have from 14 to 24 carbon atoms, preferably from 16 to 22 carbon atoms.

<9> The fat or oil composition according to any one of Items <1> to <8>, further comprising 1 mass % or more, preferably 5 mass % or more, more preferably 10 mass % or more, even more preferably 12 mass % or more and 49 mass % or less, preferably 45 mass % or less, more preferably 40 mass % or less, more preferably 39.5 mass % or less, more preferably 35 mass % or less, more preferably 30 mass % or less, more preferably 25 mass % or less, even more preferably 20 mass % or less of triacylglycerols.

<10> The fat or oil composition according to any one of Items <1> to <9>, further comprising 10 mass % or less, preferably from 0.01 to 8 mass % of monoacylglycerols, and 3.5 mass % or less, preferably from 0.01 to 1.5 mass % of free fatty acids (salts).

<11> The fat or oil composition according to any one of Items <1> to <10>, in which the fat or oil composition has a solid fat content at 5° C. of from 15 to 65%, preferably from 25 to 60%, more preferably from 30 to 55%, and has a solid fat content at 20° C. of from 8 to 40%, preferably 11 to 35%, more preferably from 12 to 30%.

<12> The fat or oil composition according to any one of Items <1> to <11>, which is obtained by separately preparing a fat or oil containing a high concentration of the disaturated diacylglycerol (SS), which includes only the saturated fatty acids, and a fat or oil containing a high concentration of the diunsaturated diacylglycerol (UU), which includes only the unsaturated fatty acids, respectively, and then blending the fats or oils so that the diacylglycerols have specific composition, and if necessary, blending a usual edible fat or oil.

<13> The fat or oil composition according to any one of Items <1> to <12>, further comprising from 0.005 to 0.5 mass %, preferably from 0.04 to 0.25 mass %, more preferably from 0.08 to 0.2 mass % of an antioxidant.

<14> The fat or oil composition according to any one of Items <1> to <13>, which is an edible fat or oil for a frozen dessert such as an ice cream or an edible ice.

<15> An emulsion, which is an oil-in-water emulsion or water-in-oil emulsion comprising the fat or oil composition according to any one of items <1> to <14>, and which has a mass ratio between an aqueous phase and an oil phase of "oil phase:aqueous phase"=from 10:90 to 90:10, preferably "oil phase:aqueous phase"=from 20:80 to 80:20, more preferably "oil phase:aqueous phase"=from 30:70 to 70:30.

EXAMPLES (Analysis Method)
(i) Composition of Glycerides in Fat or Oil
About 10 mg of a fat or oil sample and 0.5 mL of a trimethylsilylating agent ("Silylating agent TH," manufactured by Kanto Chemical Co., Inc.) were placed in a glass sample bottle, and the bottle was sealed and heated at 70° C. for 15 minutes. 1.0 mL of water and 1.5 mL of hexane were added thereto, and the bottle was shaken. The bottle was allowed to stand still, and then the upper layer was analyzed by gas-liquid chromatography (GLC).
<GLC Conditions>
(Conditions 1)
Apparatus: Agilent 6890 Series (manufactured by Agilent Technologies)
Integrator: ChemStation B 02.01 SR2 (manufactured by Agilent Technologies)
Column: DB-1ht (manufactured by Agilent J&W)
Carrier gas: 1.0 mL He/min
Injector: Split (1:50), T=320° C.
Detector: FID, T=350° C.
Oven temperature: increased from 80° C. to 340° C. at 10° C./min and kept for 15 minutes
It should be noted that the contents of SS, SU, and UU in the diacylglycerols were determined under Conditions 2.

(Conditions 2)
Apparatus: Agilent 6890 Series (manufactured by Agilent Technologies)
Integrator: ChemStation B 02.01 SR2 (manufactured by Agilent Technologies)
Column: CP, TAP for Triglyceride (manufactured by VARIAN)
Carrier gas: 1.7 mL He/min
Injector: Split (1:50), T=345° C.
Detector: FID, T=355° C.
Oven temperature: kept at 220° C. for 12 minutes, increased to 305° C. at 10° C./min, kept for 15 minutes, increased to 355° C. at 10° C./min, and kept for 30 minutes
(ii) Composition of Constituent Fatty Acids in Fat or Oil
Fatty acid methyl esters were prepared in accordance with "Preparation method for fatty acid methyl ester (2.4.1.-1996)" described in "Standard Method for Analysis of Fats and Oils" edited by Japan Oil Chemists' Society, and the resultant fat or oil samples were subjected to measurement in accordance with American Oil Chemists. Society Official Method Ce if-96 (GLC method).
(iii) Measurement of Solid Fat Content (SFC)
The solid fat content (SFC) of the fat or oil was measured by MARAN23 (Resonance Instruments Ltd.). A method of measuring the solid fat content is described below.
(1) A sample filled in a test tube was kept at 60° C. for 30 minutes.
(2) The sample was kept at 0° C. for 30 minutes and then at 26° C. for 30 minutes.
(3) The sample was kept again at 0° C. for 30 minutes and then at 5° C. for 30 minutes, and the solid fat content was measured.
(4) Subsequently, the sample was kept at 10° C. for 30 minutes, and the solid fat content was measured.
(5) In the same way as above, the solid fat content was measured in the order of 15° C., 20° C., 25° C., 30° C., and 35° C.
(Preparation of Fats or Oils A to J)
(1) Fats or Oils A to H
100 parts by mass of coconut oil fatty acid and 20 parts by mass of glycerin were mixed, and the mixture was subjected to an esterification reaction using an enzyme, thereby obtaining a diacylglycerol (DAG)-containing fat or oil. Fatty acids and monoacylglycerols were removed from the resultant esterification reaction product by distillation, and the resultant was treated with an acid (a 10% aqueous solution of citric acid was added at a concentration of 2% by mass relative to the resultant), washed with water (distilled water three times), and brought into contact with activated clay (GALLEON EARTH V2R, MIZUSAWA INDUSTRIAL CHEMICALS, LTD.), thereby obtaining a decolored oil. Further, the oil was brought into contact with water vapor to deodorize the oil, thereby obtaining a fat or oil A (DAG: 78%).

In the same manner as the fat or oil A, 100 parts by mass of palm kernel oil fatty acid and 20 parts by mass of glycerin were used to obtain a fat or oil B (DAG: 78%).

In the same manner as the fat or oil A, 100 parts by mass of palm oil fatty acid and 20 parts by mass of glycerin were used to obtain a fat or oil C (DAG: 80%).

In the same way as the fat or oil A, 100 parts by mass of a mixed fatty acid of "soybean oil fatty acid:rapeseed oil fatty acid"=7:3 (mass ratio) and 20 parts by mass of glycerin were used to obtain a fat or oil D (DAG: 86%).

In the same way as the fat or oil A, 100 parts by mass of a mixed fatty acid of "coconut oil fatty acid:rapeseed oil fatty acid"=8:2 (molar ratio) and 20 parts by mass of glycerin were used to obtain a fat or oil E (DAG: 79%).

In the same way as the fat or oil A, 100 parts by mass of a mixed fatty acid of "coconut oil fatty acid:rapeseed oil fatty acid"=7:3 (molar ratio) and 20 parts by mass of glycerin were used to obtain a fat or oil F (DAG: 79%).

In the same way as the fat or oil A, 100 parts by mass of a mixed fatty acid of "coconut oil fatty acid: rapeseed oil fatty acid:palm oil fatty acid"=4:4:2 (molar ratio) and 20 parts by mass of glycerin were used to obtain a fat or oil G (DAG: 79%).

In the same way as the fat or oil A, 100 parts by mass of hydrogenated coconut oil fatty acid and 20 parts by mass of glycerin were used to obtain a fat or oil H (DAG: 89%).

(2) Fat or Oil I 100 parts by mass of soybean extremely hardened oil (Yokozeki Oil & Fat Industries Co., Ltd.) and 40 parts by mass of glycerin were mixed, and the mixture was subjected to a glycerolysis reaction using sodium methylate as a catalyst, thereby obtaining a DAG-containing fat or oil. Fatty acids and monoacylglycerols were removed from the resultant glycerolysis reaction product by distillation, and the resultant was treated in the same manner as the fat or oil A, thereby obtaining a fat or oil I (DAG: 74%).

Table 1 shows analyzed values for the fats or oils A to I.

(3) Fat or Oil J

A fat or oil having the composition shown in Table 1 (blended oil (SUMMIT OIL MILL CO., LTD.)) was used as a fat or oil J.

Examples 1 to 17 and Comparative Examples 1 to 6

(1) Preparation of Oil-in-Water Emulsion

The fats or oils A to J were mixed at the blending ratios shown in Table 3 to prepare fat or oil compositions.

Each of the fat or oil compositions was melted at 80° C. to prepare a homogeneous oil phase. 85 parts by mass of an aqueous phase (3 parts by mass of casein sodium, 77 parts by mass of a maltose solution, 5 parts by mass of water) was heated to 80° C., and 15 parts by mass of the oil phase heated to 80° C. was added dropwise thereto while the mixture was stirred (3,000 rpm) using a homomixer (manufactured by PRIMIX Corporation). After completion of the dropwise addition, the mixture was subjected to an emulsification treatment at 7,000 rpm for 10 minutes to prepare a preliminary oil-in-water emulsion. The resultant preliminary emulsion was subjected to a homogenization treatment using the homogenizer at a temperature of 65° C. and a pressure of $4 \times 10^6$ Pa, to an UHT sterilization treatment (VTIS sterilizer manufactured by Alfa Laval, Inc.), and then to a rehomogenization treatment at a temperature of 70° C. and a pressure of $2.5 \times 10^6$ Pa. The emulsion after the homogenization treatment was cooled to 8° C., thereby obtaining an oil-in-water emulsion.

(2) Evaluation of Emulsion Stability 100 mL of the oil-in-water emulsion prepared in (1) above was taken in an emulsification test tube, and the emulsion was evaluated for its emulsion stability in accordance with the following criteria based on an amount of water separation determined after 4 hours at 5° C.

Table 3 shows the results.

(Emulsion Stability)

4: Very satisfactory emulsion stability without separation of water from emulsion 3: Satisfactory emulsified state even with separation of a small amount of water from emulsion 2: Satisfactory emulsified state even with separation of small amounts of water and oil from emulsion 1: Poor emulsified state with separation of water and oil from emulsion (3) Preparation of Lactic Ice Each of the fat or oil compositions prepared in (1) above and excellent in emulsion stability was used to prepare a lactic ice having a blending ratio (represented as mass % in terms of solids) shown in Table 2. The raw materials other than the flavor were melted at 85° C. to prepare a homogeneous mixture, and the mixture was subjected to a preliminary emulsification for 10 minutes using a puddle mixer. After that, the mixture was emulsified using a high-pressure homogenizer (Sanwa Engineering Ltd.) under a condition of 150 kg/cm².

TABLE 1

| | Fatty acid composition (%) | | | | | | | | | Glyceride composition (%) | | | | |
| | | | | | | | | | | DAG | | | | |
| | C8 or less | C10:0 | C12:0 | C14:0 | C16:0 | C18:0 | C18:1 | C18:2 | C18:3 | SS | SU | UU | MAG | TAG |
|---|---|---|---|---|---|---|---|---|---|---|---|---|---|---|
| Fat or oil A | 3.5 | 4.0 | 43.6 | 20.6 | 11.4 | 4.2 | 10.1 | 2.6 | | 59.4 | 17.3 | 1.3 | 0.9 | 20.9 |
| Fat or oil B | 2.0 | 2.4 | 42.0 | 16.3 | 9.7 | 3.1 | 21.1 | 3.4 | | 44.5 | 28.9 | 4.7 | 1.2 | 20.7 |
| Fat or oil C | | | | 1.0 | 43.3 | 4.4 | 40.4 | 10.4 | | 20.0 | 40.0 | 20.0 | 0.6 | 19.4 |
| Fat or oil D | | | | | 3.0 | 1.2 | 38.7 | 47.6 | 8.3 | | 14.8 | 71.2 | 0.5 | 13.5 |
| Fat or oil E | 2.8 | 3.2 | 34.9 | 16.4 | 9.9 | 3.7 | 20.1 | 6.3 | 2.4 | 40.3 | 32.7 | 6.6 | 1.0 | 19.4 |
| Fat or oil F | 2.5 | 2.8 | 30.5 | 14.4 | 9.2 | 3.5 | 25.0 | 8.1 | 3.6 | 31.6 | 37.0 | 10.8 | 1.0 | 19.6 |
| Fat or oil G | 1.4 | 1.6 | 17.6 | 16.9 | 7.1 | 10.5 | 30.1 | 9.5 | 4.8 | 5.0 | 39.0 | 15.7 | 1.0 | 20.0 |
| Fat or oil H | 4.3 | 4.5 | 46.8 | 20.0 | 10.6 | 13.7 | | | | 88.5 | | | 1.9 | 9.5 |
| Fat or oil I | | | | | 9.7 | 87.8 | | | | 74.0 | | | 9.1 | 16.9 |
| Fat or oil J | | | | | 4.0 | 1.8 | 59.8 | 21.1 | 12.0 | | | | | 100.0 |

MAG: Monoacylglycerol
DAG: Diacylglycerol
TAG: Triacylglycerol

The resultant emulsion was heated to 85° C. to sterilize the emulsion and immediately cooled to 5° C. The resultant was aged at the same temperature for 24 hours, thereby obtaining an oil-in-water emulsion. A flavor was added to the resultant oil-in-water emulsion, and the mixture was subjected to a freezing in an ice cream freezer (Mitsubishi Electric Corporation), thereby obtaining a lactic ice. It should be noted that a monoglyceride (EXCEL T-95, Kao Corporation) was used as an emulsifier, and a thickener (SAN BEST AS-1, San-Ei Gen F.F.I., Inc.) was used as a stabilizer.

TABLE 2

| Raw materials | (Part(s) by mass) |
|---|---|
| Fat or oil composition | 8 |
| Sugar | 7.5 |
| Sugar syrup | 10.25 |
| Skim milk | 5 |
| Emulsifier | 0.3 |
| Stabilizer | 0.35 |
| Dye | 0.05 |
| Flavor | 0.0325 |

The resultant lactic ice was filled in a container and solidified at −20° C., and then five panelists ate 10 g of the lactic ice and evaluated the lactic ice in accordance with the following criteria. The average values were calculated as scores. Table 3 shows the results.

(Melt-in-the-mouth feeling)
4: Very plain and satisfactory melt-in-the-mouth feeling
3: Plain and satisfactory melt-in-the-mouth feeling
2: Slightly sticky but satisfactory melt-in-the-mouth feeling
1: Sticky and poor melt-in-the-mouth feeling (Palate Feeling)
4: Light and very sharp
3: Light and sharp
2: Slightly heavy
1: Heavy (Fineness/Texture (Roughness))
4: Very smooth and fine
3: Smooth and fine
2: Slightly rough
1: Coarse and rough (Taste and Flavor)
4: Very creamy and satisfactory taste and flavor
3: Creamy and satisfactory taste and flavor
2: Slightly poor taste and flavor
1: Poor taste and flavor

TABLE 3

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Fat or oil A | 80 | 60 | 40 | | | | | | 30 | 20 | | | |
| Fat or oil B | | | | 80 | 60 | 40 | | | | | | | |
| Fat or oil C | | | | | | | | | 30 | 60 | | | |
| Fat or oil D | 20 | 40 | 60 | 20 | 40 | 60 | 5 | | 40 | 20 | | 25 | 40 |
| Fat or oil E | | | | | | | 95 | | | | | | |
| Fat or oil F | | | | | | | | 100 | | | | | |
| Fat or oil G | | | | | | | | | | | 100 | | |
| Fat or oil H | | | | | | | | | | | | 75 | 60 |
| Fat or oil I | | | | | | | | | | | | | |
| Fat or oil J | | | | | | | | | | | | | |
| Amount of DAG (%) | 79.6 | 81.2 | 82.8 | 79.6 | 81.2 | 82.8 | 79.9 | 79.4 | 81.8 | 80.8 | 79.0 | 87.9 | 87.5 |
| Ratio in DAG (%) | | | | | | | | | | | | | |
| SS | 59.7 | 43.9 | 28.7 | 44.7 | 32.8 | 21.5 | 47.9 | 39.8 | 29.1 | 29.6 | 30.7 | 75.5 | 60.7 |
| SU | 21.1 | 20.1 | 19.1 | 32.7 | 28.6 | 24.7 | 39.8 | 46.6 | 28.3 | 37.7 | 49.4 | 4.2 | 6.8 |
| UU | 19.2 | 36.0 | 52.2 | 22.6 | 38.5 | 53.8 | 12.3 | 13.6 | 42.6 | 32.8 | 19.9 | 20.3 | 32.5 |
| Ratio in saturated fatty acids in DAG (%) | | | | | | | | | | | | | |
| C10:0 + C12:0 + C14:0 | 77.2 | 75.7 | 72.9 | 79.3 | 77.6 | 74.3 | 76.6 | 75.9 | 48.9 | 30.0 | 65.6 | 70.3 | 69.4 |
| SFC (%) | | | | | | | | | | | | | |
| 5° C. | 50.7 | 38.0 | 25.4 | 42.4 | 31.8 | 21.2 | 29.6 | 25.0 | 37.5 | 49.6 | 17.3 | 59.0 | 49.6 |
| 20° C. | 23.5 | 17.6 | 11.8 | 19.9 | 14.9 | 10.0 | 16.2 | 14.0 | 21.8 | 31.8 | 3.8 | 36.8 | 29.4 |
| Evaluation of oil-in-water emulsion | | | | | | | | | | | | | |
| Emulsion stability | 4 | 4 | 4 | 4 | 4 | 4 | 2 | 3 | 4 | 4 | 4 | 3 | 4 |
| Evaluation of lactic ice | | | | | | | | | | | | | |
| Melt-in-the-mouth feeling | 4 | 4 | 4 | 4 | 4 | 4 | 4 | 4 | 3 | 2 | 4 | 4 | 4 |
| Palate feeling | 4 | 4 | 4 | 4 | 4 | 4 | 3 | 2 | 4 | 3 | 2 | 4 | 4 |
| Fineness/texture (roughness) | 4 | 4 | 3 | 4 | 4 | 2 | 4 | 4 | 4 | 4 | 4 | 4 | 4 |
| Taste and flavor (richness) | 4 | 4 | 4 | 4 | 4 | 4 | 4 | 3 | 4 | 4 | 3 | 4 | 4 |

TABLE 3-continued

|  | Example | | | | Comparative Example | | | | | |
| --- | --- | --- | --- | --- | --- | --- | --- | --- | --- | --- |
|  | 14 | 15 | 16 | 17 | 1 | 2 | 3 | 4 | 5 | 6 |
| Fat or oil A |  |  | 10 | 50 | 100 |  | 20 |  |  |  |
| Fat or oil B |  |  |  |  |  | 100 |  | 20 |  |  |
| Fat or oil C |  |  |  |  |  |  |  | 30 |  |  |
| Fat or oil D | 60 | 80 | 70 | 30 |  |  | 80 | 50 | 85 | 10 |
| Fat or oil E |  |  |  |  |  |  |  |  |  |  |
| Fat or oil F |  |  |  |  |  |  |  |  |  | 40 |
| Fat or oil G |  |  |  |  |  |  |  |  |  |  |
| Fat or oil H | 40 | 20 |  |  |  |  |  |  |  |  |
| Fat or oil I |  |  | 20 |  |  |  |  |  | 15 |  |
| Fat or oil J |  |  |  | 20 |  |  |  |  |  | 50 |
| Amount of DAG (%) | 87.0 | 86.5 | 82.8 | 64.8 | 78.0 | 78.0 | 84.4 | 82.6 | 84.2 | 40.4 |
| Ratio in DAG (%) |  |  |  |  |  |  |  |  |  |  |
| SS | 40.7 | 20.5 | 25.0 | 45.8 | 76.1 | 57.0 | 14.1 | 18.0 | 13.2 | 31.3 |
| SU | 10.2 | 13.7 | 14.6 | 20.2 | 22.2 | 37.0 | 18.1 | 30.5 | 15.0 | 40.3 |
| UU | 49.1 | 65.8 | 60.3 | 33.9 | 1.6 | 6.0 | 67.8 | 51.5 | 71.9 | 28.4 |
| Ratio in saturated fatty acids in DAG (%) |  |  |  |  |  |  |  |  |  |  |
| C10:0 + C12:0 + C14:0 | 67.1 | 61.2 | 21.9 | 75.9 | 78.1 | 80.4 | 65.6 | 39.1 | 0.0 | 74.7 |
| SFC (%) |  |  |  |  |  |  |  |  |  |  |
| 5° C. | 33.0 | 16.5 | 25.9 | 31.7 | 63.4 | 53.0 | 12.7 | 29.1 | 14.7 | 10.0 |
| 20° C. | 19.6 | 9.8 | 21.9 | 14.7 | 29.4 | 24.9 | 5.9 | 17.9 | 14.3 | 5.6 |
| Evaluation of oil-in-water emulsion |  |  |  |  |  |  |  |  |  |  |
| Emulsion stability | 4 | 4 | 4 | 4 | 1 | 1 | 4 | 4 | 4 | 4 |
| Evaluation of lactic ice |  |  |  |  |  |  |  |  |  |  |
| Melt-in-the-mouth feeling | 4 | 4 | 2 | 4 | — | — | 4 | 3 | 1 | 4 |
| Palate feeling | 4 | 4 | 4 | 4 | — | — | 4 | 4 | 4 | 3 |
| Fineness/texture (roughness) | 4 | 2 | 3 | 4 | — | — | 1 | 1 | 1 | 4 |
| Taste and flavor (richness) | 4 | 4 | 4 | 3 | — | — | 4 | 4 | 4 | 1 |

As is apparent from Table 3, the oil-in-water emulsions comprising the fat or oil compositions according to the present invention hardly cause oil separation and are excellent in emulsion stability, as compared to those of Comparative Examples. In addition, the lactic ice according to the present invention has satisfactory fineness and texture and is excellent in melt-in-the-mouth feeling, palate feeling, and taste and flavor.

The invention claimed is:

1. A fat or oil composition, comprising 50 mass % or more of diacylglycerols which comprise:
   (1) from 32.8 mass % to 85 mass % of a disaturated diacylglycerol (SS) in the diacylglycerols;
   (2) 45 mass % or less of a monosaturated-monounsaturated diacylglycerol (SU) in the diacylglycerols; and
   (3) 13 to 80 mass % of a diunsaturated diacylglycerol (UU) in the diacylglycerols; wherein a total content of saturated fatty acids having 10, 12, and 14 carbon atoms in saturated fatty acids constituting the diacylglycerols is 25 mass % or more.

2. The fat or oil composition according to claim 1, wherein the diacylglycerols have a content of 2 mass % or more and 40 mass % or less of the monosaturated-monounsaturated diacylglycerol (SU) in the diacylglycerols.

3. The fat or oil composition according to claim 1, wherein the diacylglycerols have a content of 30 mass % or more of a total content of saturated fatty acids having 10, 12, and 14 carbon atoms in saturated fatty acids constituting the diacylglycerols.

4. The fat or oil composition according to claim 1, wherein the diacylglycerols comprise:
   (1) 32.8 mass % or more and 75 mass % or less of the disaturated diacylglycerol (SS) in the diacylglycerols;
   (2) 2 mass % or more and 35 mass % or less of the monosaturated-monounsaturated diacylglycerol (SU) in the diacylglycerols; and
   (3) 18 mass % or more and 60 mass % or less of the diunsaturated diacylglycerol (UU) in the diacylglycerols;
   wherein a total content of saturated fatty acids having 10, 12, and 14 carbon atoms in saturated fatty acids constituting the diacylglycerols is 50 mass % or more and 80 mass % or less.

5. The fat or oil composition according to claim 1, wherein the diacylglycerols comprise:
   (1) 32.8 mass % or more and 62 mass % or less of the disaturated diacylglycerol (SS) in the diacylglycerols;
   (2) 4 mass % or more and 33 mass % or less of the monosaturated-monounsaturated diacylglycerol (SU) in the diacylglycerols; and
   (3) 18 mass % or more and 70 mass % or less of the diunsaturated diacylglycerol (UU) in the diacylglycerols;

wherein a total content of saturated fatty acids having 10, 12, and 14 carbon atoms in saturated fatty acids constituting the diacylglycerols is 60 mass % or more and 80 mass % or less.

6. The fat or oil composition according to claim 1, wherein a content of the diacylglycerols is 55 mass % or more and 95 mass % or less.

7. The fat or oil composition according to claim 1, wherein a content of the diacylglycerols is 60 mass % or more and 90 mass % or less.

8. The fat or oil composition according to claim 1, wherein a content of the diacylglycerols is 70 mass % or more and 95 mass % or less.

9. The fat or oil composition according to claim 1, wherein a content of the diacylglycerols is 75 mass % or more and 88 mass % or less.

10. A fat or oil composition comprising 50 mass % or more of diacylglycerols which comprise:
   (1) 32.8 to 92 mass % of a disaturated diacylglycerol (SS) in the diacylglycerols;
   (2) 60 mass % or less of a monosaturated-monounsaturated diacylglycerol (SU) in the diacylglycerols; and
   (3) 8 to 80 mass % of a diunsaturated diacylglycerol (UU) in the diacylglycerols;
   wherein a total content of saturated fatty acids having 10, 12, and 14 carbon atoms in saturated fatty acids constituting the diacylglycerols is 20 mass % or more, and
   wherein the fat or oil composition has a solid fat content at 5° C. of from 15 to 65%.

11. The fat or oil composition according to claim 10, wherein the fat or oil composition has a solid fat content at 5° C. of from 25 to 60%.

12. The fat or oil composition according to claim 10, wherein the fat or oil composition has a solid fat content at 5° C. of from 30 to 55%.

13. The fat or oil composition according to claim 1, wherein the fat or oil composition has a solid fat content at 20° C. of from 8 to 40%.

14. The fat or oil composition according to claim 1, wherein the fat or oil composition has a solid fat content at 20° C. of from 11 to 35%.

15. The fat or oil composition according to claim 4, wherein the fat or oil composition has a solid fat content at 20° C. of from 12 to 30%.

16. The fat or oil composition according to claim 1, wherein the fat or oil composition comprises from 1 to 49 mass % of triacylglycerols, 10 mass % or less of monoacylglycerols, and 3.5 mass % or less of free fatty acids.

17. The fat or oil composition according to claim 1, wherein the fat or oil composition comprises from 5 to 45 mass % of triacylglycerols, from 0.01 to 8 mass % of monoacylglycerols, and from 0.01 to 1.5 mass % of free fatty acids.

18. The fat or oil composition according to claim 1, wherein the fat or oil composition comprises from 12 to 35 mass % of triacylglycerols, from 0.01 to 8 mass % of monoacylglycerols, and from 0.01 to 1.5 mass % of free fatty acids.

19. An emulsion, comprising the fat or oil composition according to claim 1, and having a mass ratio between an oil phase and an aqueous phase of from 10:90 to 90:10.

20. A frozen dessert, comprising the fat or oil composition according to claim 1.

21. The frozen dessert of claim 20, wherein the frozen dessert is an ice cream.

22. The frozen dessert of claim 20, wherein the frozen dessert is an edible ice.

* * * * *